US008667189B2

(12) United States Patent
Lu et al.

(10) Patent No.: US 8,667,189 B2
(45) Date of Patent: *Mar. 4, 2014

(54) COMBINED STREAM AUXILIARY COPY SYSTEM AND METHOD

(71) Applicant: CommVault Systems, Inc., Oceanport, NJ (US)

(72) Inventors: Jun Lu, Tinton Falls, NJ (US); Parag Gokhale, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,207

(22) Filed: Jan. 18, 2013

(65) Prior Publication Data

US 2013/0204844 A1 Aug. 8, 2013

Related U.S. Application Data

(63) Continuation of application No. 10/663,384, filed on Sep. 16, 2003, now Pat. No. 8,370,542.

(60) Provisional application No. 60/411,202, filed on Sep. 16, 2002.

(51) Int. Cl.
*G06F 13/00* (2006.01)

(52) U.S. Cl.
USPC .......................................... 710/33

(58) Field of Classification Search
None
See application file for complete search history.

(56) References Cited

U.S. PATENT DOCUMENTS

| 4,296,465 A | 10/1981 | Lemak |
| 4,686,620 A | 8/1987 | Ng |
| 4,695,943 A | 9/1987 | Keeley et al. |
| 4,888,689 A | 12/1989 | Taylor et al. |
| 4,995,035 A | 2/1991 | Cole et al. |
| 5,005,122 A | 4/1991 | Griffin et al. |

(Continued)

FOREIGN PATENT DOCUMENTS

| CA | 2499073 | 7/2013 |
| EP | 0259912 | 3/1988 |

(Continued)

OTHER PUBLICATIONS

U.S. Appl. No. 13/691,506, filed Nov. 30, 2012, Ignatius, et al.

(Continued)

*Primary Examiner* — Henry Tsai
*Assistant Examiner* — Aurangzeb Hassan
(74) *Attorney, Agent, or Firm* — Knobbe, Martens, Olson & Bear, LLP

(57) ABSTRACT

A system and method for transferring data in a library storage system. The library storage system comprises a management server including a storage policy. A media agent is connected to the management server. A plurality of storage media and a data source are connected to the media agent. The data source is divided into at least a first and a second portion of data. The portions of data are transferred from the data source to a first and second primary storage medium using a first and a second data stream respectively. The media agent then causes the first and second portion of data to be transferred from the first and second storage medium to a third auxiliary storage medium using a third combined data stream. Auxiliary copying is performed in chunks and multiple streams are copied in parallel.

16 Claims, 3 Drawing Sheets

(56) References Cited

U.S. PATENT DOCUMENTS

| | | | |
|---|---|---|---|
| 5,062,104 | A | 10/1991 | Lubarsky et al. |
| 5,093,912 | A | 3/1992 | Dong et al. |
| 5,133,065 | A | 7/1992 | Cheffetz et al. |
| 5,163,131 | A | 11/1992 | Row et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,247,616 | A | 9/1993 | Berggren et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,351 | A | 4/1994 | Jippo |
| 5,311,509 | A | 5/1994 | Heddes et al. |
| 5,321,816 | A | 6/1994 | Rogan et al. |
| 5,333,315 | A | 7/1994 | Saether et al. |
| 5,347,653 | A | 9/1994 | Flynn et al. |
| 5,377,341 | A | 12/1994 | Kaneko et al. |
| 5,388,243 | A | 2/1995 | Glider et al. |
| 5,410,700 | A | 4/1995 | Fecteau et al. |
| 5,428,783 | A | 6/1995 | Lake |
| 5,448,724 | A | 9/1995 | Hayashi et al. |
| 5,465,359 | A | 11/1995 | Allen et al. |
| 5,487,160 | A | 1/1996 | Bemis |
| 5,491,810 | A | 2/1996 | Allen |
| 5,495,607 | A | 2/1996 | Pisello et al. |
| 5,504,873 | A | 4/1996 | Martin et al. |
| 5,515,502 | A | 5/1996 | Wood |
| 5,544,345 | A | 8/1996 | Carpenter et al. |
| 5,544,347 | A | 8/1996 | Yanai et al. |
| 5,555,404 | A | 9/1996 | Torbjornsen et al. |
| 5,559,957 | A | 9/1996 | Balk |
| 5,559,991 | A | 9/1996 | Kanfi |
| 5,588,117 | A | 12/1996 | Karp et al. |
| 5,592,618 | A | 1/1997 | Micka et al. |
| 5,598,546 | A | 1/1997 | Blomgren |
| 5,606,359 | A | 2/1997 | Youden et al. |
| 5,615,392 | A | 3/1997 | Harrison et al. |
| 5,619,644 | A | 4/1997 | Crockett et al. |
| 5,638,509 | A | 6/1997 | Dunphy et al. |
| 5,642,496 | A | 6/1997 | Kanfi |
| 5,644,779 | A | 7/1997 | Song |
| 5,651,002 | A | 7/1997 | Van Seters et al. |
| 5,673,381 | A | 9/1997 | Huai et al. |
| 5,675,511 | A | 10/1997 | Prasad et al. |
| 5,680,550 | A | 10/1997 | Kuszmaul et al. |
| 5,682,513 | A | 10/1997 | Candelaria et al. |
| 5,687,343 | A | 11/1997 | Fecteau et al. |
| 5,692,152 | A | 11/1997 | Cohen et al. |
| 5,699,361 | A | 12/1997 | Ding et al. |
| 5,719,786 | A | 2/1998 | Nelson et al. |
| 5,729,743 | A | 3/1998 | Squibb |
| 5,737,747 | A | 4/1998 | Vishlitsky et al. |
| 5,751,997 | A | 5/1998 | Kullick et al. |
| 5,758,359 | A | 5/1998 | Saxon |
| 5,761,104 | A | 6/1998 | Lloyd et al. |
| 5,761,677 | A | 6/1998 | Senator et al. |
| 5,761,734 | A | 6/1998 | Pfeffer et al. |
| 5,764,972 | A | 6/1998 | Crouse et al. |
| 5,771,391 | A | 6/1998 | Lloyd et al. |
| 5,778,395 | A | 7/1998 | Whiting et al. |
| 5,790,828 | A | 8/1998 | Jost |
| 5,805,920 | A | 9/1998 | Sprenkle et al. |
| 5,812,398 | A | 9/1998 | Nielsen |
| 5,813,008 | A | 9/1998 | Benson et al. |
| 5,813,009 | A | 9/1998 | Johnson et al. |
| 5,813,017 | A | 9/1998 | Morris |
| 5,815,462 | A | 9/1998 | Konishi et al. |
| 5,829,023 | A | 10/1998 | Bishop |
| 5,829,046 | A | 10/1998 | Tzelnic et al. |
| 5,860,104 | A | 1/1999 | Witt et al. |
| 5,875,478 | A | 2/1999 | Blumenau |
| 5,875,481 | A | 2/1999 | Ashton et al. |
| 5,878,056 | A | 3/1999 | Black et al. |
| 5,887,134 | A | 3/1999 | Ebrahim |
| 5,890,159 | A | 3/1999 | Sealby et al. |
| 5,897,643 | A | 4/1999 | Matsumoto |
| 5,901,327 | A | 5/1999 | Ofek |
| 5,924,102 | A | 7/1999 | Perks |
| 5,926,836 | A | 7/1999 | Blumenau |
| 5,933,104 | A | 8/1999 | Kimura |
| 5,936,871 | A | 8/1999 | Pan et al. |
| 5,950,205 | A | 9/1999 | Aviani, Jr. |
| 5,956,519 | A | 9/1999 | Wise et al. |
| 5,958,005 | A | 9/1999 | Thorne et al. |
| 5,970,233 | A | 10/1999 | Liu et al. |
| 5,970,255 | A | 10/1999 | Tran et al. |
| 5,974,563 | A | 10/1999 | Beeler, Jr. |
| 5,987,478 | A | 11/1999 | See et al. |
| 5,995,091 | A | 11/1999 | Near et al. |
| 5,999,629 | A | 12/1999 | Heer et al. |
| 6,003,089 | A | 12/1999 | Shaffer et al. |
| 6,009,274 | A | 12/1999 | Fletcher et al. |
| 6,012,090 | A | 1/2000 | Chung et al. |
| 6,021,415 | A | 2/2000 | Cannon et al. |
| 6,023,705 | A * | 2/2000 | Bellinger et al. ................. 1/1 |
| 6,026,414 | A | 2/2000 | Anglin |
| 6,041,334 | A | 3/2000 | Cannon |
| 6,052,735 | A | 4/2000 | Ulrich et al. |
| 6,058,494 | A | 5/2000 | Gold et al. |
| 6,076,148 | A | 6/2000 | Kedem et al. |
| 6,094,416 | A | 7/2000 | Ying |
| 6,094,684 | A | 7/2000 | Pallmann |
| 6,101,255 | A | 8/2000 | Harrison et al. |
| 6,105,129 | A | 8/2000 | Meier et al. |
| 6,105,150 | A | 8/2000 | Noguchi et al. |
| 6,112,239 | A | 8/2000 | Kenner et al. |
| 6,122,668 | A | 9/2000 | Teng et al. |
| 6,131,095 | A | 10/2000 | Low et al. |
| 6,131,190 | A | 10/2000 | Sidwell |
| 6,137,864 | A | 10/2000 | Yaker |
| 6,148,412 | A | 11/2000 | Cannon et al. |
| 6,154,787 | A | 11/2000 | Urevig et al. |
| 6,154,852 | A * | 11/2000 | Amundson et al. ........ 714/5.11 |
| 6,161,111 | A | 12/2000 | Mutalik et al. |
| 6,167,402 | A | 12/2000 | Yeager |
| 6,175,829 | B1 | 1/2001 | Li et al. |
| 6,212,512 | B1 | 4/2001 | Barney et al. |
| 6,230,164 | B1 | 5/2001 | Rikieta et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,292,783 | B1 | 9/2001 | Rohler |
| 6,295,541 | B1 | 9/2001 | Bodnar |
| 6,301,592 | B1 | 10/2001 | Aoyama et al. |
| 6,304,880 | B1 | 10/2001 | Kishi |
| 6,324,581 | B1 | 11/2001 | Xu et al. |
| 6,328,766 | B1 | 12/2001 | Long |
| 6,330,570 | B1 | 12/2001 | Crighton et al. |
| 6,330,572 | B1 | 12/2001 | Sitka |
| 6,330,642 | B1 | 12/2001 | Carteau |
| 6,343,324 | B1 | 1/2002 | Hubis et al. |
| 6,350,199 | B1 | 2/2002 | Williams et al. |
| RE37,601 | E | 3/2002 | Eastridge et al. |
| 6,353,878 | B1 | 3/2002 | Dunham |
| 6,356,801 | B1 | 3/2002 | Goodman et al. |
| 6,374,266 | B1 | 4/2002 | Shnelvar |
| 6,374,336 | B1 | 4/2002 | Peters et al. |
| 6,381,331 | B1 | 4/2002 | Kato |
| 6,385,673 | B1 | 5/2002 | DeMoney |
| 6,389,432 | B1 | 5/2002 | Pothapragada et al. |
| 6,418,478 | B1 | 7/2002 | Ignatius et al. |
| 6,421,711 | B1 | 7/2002 | Blumenau et al. |
| 6,438,586 | B1 | 8/2002 | Hass et al. |
| 6,487,561 | B1 | 11/2002 | Ofek et al. |
| 6,487,644 | B1 | 11/2002 | Huebsch et al. |
| 6,505,307 | B1 | 1/2003 | Stell et al. |
| 6,519,679 | B2 | 2/2003 | Devireddy et al. |
| 6,538,669 | B1 | 3/2003 | Lagueux, Jr. et al. |
| 6,542,909 | B1 | 4/2003 | Tamer et al. |
| 6,542,972 | B2 | 4/2003 | Ignatius et al. |
| 6,546,500 | B1 * | 4/2003 | Miyamoto ................. 714/6.3 |

(56) References Cited

U.S. PATENT DOCUMENTS

| | | |
|---|---|---|
| 6,564,228 B1 | 5/2003 | O'Connor |
| 6,571,310 B1 | 5/2003 | Ottesen et al. |
| 6,577,734 B1 | 6/2003 | Etzel et al. |
| 6,581,143 B2 | 6/2003 | Gagne et al. |
| 6,604,149 B1 | 8/2003 | Deo et al. |
| 6,631,442 B1 | 10/2003 | Blumenau |
| 6,631,493 B2 | 10/2003 | Ottesen et al. |
| 6,647,396 B2 | 11/2003 | Parnell et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,675,177 B1 | 1/2004 | Webb |
| 6,732,124 B1 | 5/2004 | Koseki et al. |
| 6,742,092 B1 | 5/2004 | Huebsch et al. |
| 6,757,794 B2 | 6/2004 | Cabrera et al. |
| 6,763,351 B1 | 7/2004 | Subramaniam et al. |
| 6,772,332 B1 | 8/2004 | Boebert et al. |
| 6,785,786 B1 | 8/2004 | Gold et al. |
| 6,789,161 B1 | 9/2004 | Blendermann et al. |
| 6,791,910 B1 | 9/2004 | James et al. |
| 6,859,758 B1 | 2/2005 | Prabhakaran et al. |
| 6,871,163 B2 | 3/2005 | Hiller et al. |
| 6,880,052 B2 | 4/2005 | Lubbers et al. |
| 6,886,020 B1 | 4/2005 | Zahavi et al. |
| 6,909,722 B1 | 6/2005 | Li |
| 6,928,513 B2 | 8/2005 | Lubbers et al. |
| 6,952,758 B2 | 10/2005 | Chron et al. |
| 6,965,968 B1 | 11/2005 | Touboul |
| 6,968,351 B2 | 11/2005 | Butterworth |
| 6,973,553 B1 | 12/2005 | Archibald, Jr. et al. |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,035,880 B1 | 4/2006 | Crescenti et al. |
| 7,062,761 B2 | 6/2006 | Slavin et al. |
| 7,069,380 B2 | 6/2006 | Ogawa et al. |
| 7,085,904 B2 | 8/2006 | Mizuno et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,633 B2 | 12/2006 | Tuma et al. |
| 7,159,110 B2 | 1/2007 | Douceur et al. |
| 7,174,433 B2 | 2/2007 | Kottomtharayil et al. |
| 7,209,972 B1 | 4/2007 | Ignatius et al. |
| 7,246,140 B2 | 7/2007 | Therrien et al. |
| 7,246,207 B2 | 7/2007 | Kottomtharayil et al. |
| 7,246,272 B2 | 7/2007 | Cabezas et al. |
| 7,269,612 B2 | 9/2007 | Devarakonda et al. |
| 7,272,606 B2 | 9/2007 | Borthakur et al. |
| 7,277,941 B2 | 10/2007 | Ignatius et al. |
| 7,278,142 B2 | 10/2007 | Bandhole et al. |
| 7,287,047 B2 | 10/2007 | Kavuri |
| 7,287,252 B2 | 10/2007 | Bussiere et al. |
| 7,293,133 B1 | 11/2007 | Colgrove et al. |
| 7,298,846 B2 | 11/2007 | Bacon et al. |
| 7,315,923 B2 | 1/2008 | Retnamma et al. |
| 7,346,623 B2 | 3/2008 | Prahlad et al. |
| 7,359,917 B2 | 4/2008 | Winter et al. |
| 7,380,072 B2 | 5/2008 | Kottomtharayil et al. |
| 7,398,429 B2 | 7/2008 | Shaffer et al. |
| 7,401,154 B2 | 7/2008 | Ignatius et al. |
| 7,409,509 B2 | 8/2008 | Devassy et al. |
| 7,448,079 B2 | 11/2008 | Tremain |
| 7,454,569 B2 | 11/2008 | Kavuri et al. |
| 7,457,933 B2 | 11/2008 | Pferdekaemper et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,500,150 B2 | 3/2009 | Sharma et al. |
| 7,509,019 B2 | 3/2009 | Kaku |
| 7,519,726 B2 | 4/2009 | Palliyil et al. |
| 7,523,483 B2 | 4/2009 | Dogan |
| 7,529,748 B2 | 5/2009 | Wen et al. |
| 7,536,291 B1 | 5/2009 | Vijayan Retnamma et al. |
| 7,546,324 B2 | 6/2009 | Prahlad et al. |
| 7,546,482 B2 | 6/2009 | Blumenau et al. |
| 7,581,077 B2 | 8/2009 | Ignatius et al. |
| 7,596,586 B2 | 9/2009 | Gokhale et al. |
| 7,613,748 B2 | 11/2009 | Brockway et al. |
| 7,627,598 B1 | 12/2009 | Burke |
| 7,627,617 B2 | 12/2009 | Kavuri et al. |
| 7,631,194 B2 | 12/2009 | Wahlert et al. |
| 7,685,126 B2 | 3/2010 | Patel et al. |
| 7,739,381 B2 | 6/2010 | Ignatius et al. |
| 7,765,369 B1 | 7/2010 | Prahlad et al. |
| 7,809,914 B2 | 10/2010 | Kottomtharayil et al. |
| 7,840,533 B2 | 11/2010 | Prahlad et al. |
| 7,840,537 B2 | 11/2010 | Gokhale et al. |
| 7,861,050 B2 | 12/2010 | Retnamma et al. |
| 7,962,642 B2 | 6/2011 | Ignatius et al. |
| 7,975,061 B1 | 7/2011 | Gokhale et al. |
| 8,019,963 B2 | 9/2011 | Ignatius et al. |
| 8,131,964 B2 | 3/2012 | Retnamma et al. |
| 8,166,263 B2 | 4/2012 | Prahlad |
| 8,219,524 B2 | 7/2012 | Gokhale |
| 8,239,654 B2 | 8/2012 | Ignatius et al. |
| 8,326,915 B2 | 12/2012 | Ignatius et al. |
| 8,370,542 B2 | 2/2013 | Lu et al. |
| 2002/0004883 A1 | 1/2002 | Nguyen et al. |
| 2002/0029281 A1 | 3/2002 | Zeidner et al. |
| 2002/0040405 A1 | 4/2002 | Gold |
| 2002/0042869 A1 | 4/2002 | Tate et al. |
| 2002/0042882 A1 | 4/2002 | Dervan et al. |
| 2002/0049778 A1 | 4/2002 | Bell et al. |
| 2002/0065967 A1 | 5/2002 | MacWilliams et al. |
| 2002/0069369 A1 | 6/2002 | Tremain |
| 2002/0107877 A1 | 8/2002 | Whiting et al. |
| 2002/0129203 A1 | 9/2002 | Gagne et al. |
| 2002/0163760 A1 * | 11/2002 | Lindsey et al. ............... 360/134 |
| 2002/0188691 A1 | 12/2002 | Ignatius et al. |
| 2002/0194340 A1 | 12/2002 | Ebstyne et al. |
| 2002/0198983 A1 | 12/2002 | Ullmann et al. |
| 2003/0014433 A1 | 1/2003 | Teloh et al. |
| 2003/0016609 A1 | 1/2003 | Rushton et al. |
| 2003/0061491 A1 | 3/2003 | Jaskiewicz et al. |
| 2003/0066070 A1 | 4/2003 | Houston |
| 2003/0079112 A1 | 4/2003 | Sachs et al. |
| 2003/0169733 A1 | 9/2003 | Gurkowski et al. |
| 2004/0073716 A1 | 4/2004 | Boom et al. |
| 2004/0088432 A1 | 5/2004 | Hubbard et al. |
| 2004/0107199 A1 | 6/2004 | Dairymple et al. |
| 2004/0193953 A1 | 9/2004 | Callahan et al. |
| 2004/0210796 A1 | 10/2004 | Largman et al. |
| 2004/0225834 A1 | 11/2004 | Lu et al. |
| 2004/0230829 A1 | 11/2004 | Dogan et al. |
| 2005/0033756 A1 | 2/2005 | Kottomtharayil et al. |
| 2005/0114406 A1 | 5/2005 | Borthakur et al. |
| 2005/0114477 A1 | 5/2005 | Willging et al. |
| 2005/0166011 A1 | 7/2005 | Burnett et al. |
| 2005/0172093 A1 | 8/2005 | Jain |
| 2005/0246510 A1 | 11/2005 | Retnamma et al. |
| 2005/0246568 A1 | 11/2005 | Davies |
| 2005/0256972 A1 | 11/2005 | Cochran et al. |
| 2005/0262296 A1 | 11/2005 | Peake |
| 2005/0268068 A1 | 12/2005 | Ignatius et al. |
| 2006/0005048 A1 | 1/2006 | Osaki et al. |
| 2006/0010227 A1 | 1/2006 | Atluri |
| 2006/0044674 A1 | 3/2006 | Martin et al. |
| 2006/0129768 A1 | 6/2006 | Pferdekaemper et al. |
| 2006/0149889 A1 | 7/2006 | Sikha |
| 2006/0224846 A1 | 10/2006 | Amarendran et al. |
| 2007/0288536 A1 | 12/2007 | Sen et al. |
| 2008/0059515 A1 | 3/2008 | Fulton |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |

(56) References Cited

U.S. PATENT DOCUMENTS

| | | | |
|---|---|---|---|
| 2008/0256173 | A1 | 10/2008 | Ignatius et al. |
| 2009/0319534 | A1 | 12/2009 | Gokhale |
| 2010/0131461 | A1 | 5/2010 | Prahlad et al. |
| 2012/0166745 | A1 | 6/2012 | Retnamma et al. |
| 2013/0185377 | A1 | 7/2013 | Ignatius et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1115064 | 12/2004 |
| GB | 2366048 | 2/2002 |
| WO | WO 95/13580 | 5/1995 |
| WO | WO 98/39707 | 9/1998 |
| WO | WO 98/39709 | 9/1998 |
| WO | WO 99/12098 | 3/1999 |
| WO | WO 99/14692 | 3/1999 |
| WO | WO 99/17204 | 4/1999 |
| WO | WO 02/05466 | 1/2002 |
| WO | WO 2004/090788 | 10/2004 |
| WO | WO 2005/055093 | 6/2005 |

OTHER PUBLICATIONS

Armstead et al., "Implementation of a Campus-Wide Distributed Mass Storage Service: The Dream vs. Reality," IEEE, 1995, pp. 190-199.

Arneson, "Development of Omniserver; Mass Storage Systems," Control Data Corporation, 1990, pp. 88-93.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Commvault Systems, Inc., Continuous Data Replicator 7.0, Product Data Sheet, 2007.

Eitel, "Backup and Storage Management in Distributed Heterogeneous Environments," IEEE, 1994, pp. 124-126.

Farley, "Building Storage Networks," pp. 328-331, Osborne/McGraw-Hill, 2000.

Gait, "The Optical File Cabinet: A Random-Access File system for Write-Once Optical Disks," IEEE Computer, vol. 21, No. 6, pp. 11-22 (1988).

Gibson, "Network Attached Storage Architecture," pp. 37-45, ACM, Nov. 2000.

http://en.wikipedia.org/wiki/Naive_Bayes_classifier, printed on Jun. 1, 2010, in 7 pages.

Jander, "Launching Storage-Area Net," Data Communications, US, McGraw Hill, NY, vol. 27, No. 4(Mar. 21, 1998), pp. 64-72.

Recycle Bin (Windows), Aug. 2007, Wikipedia, pp. 1-3.

SZOR, The Art of Virus Research and Defense, Symantec Press (2005) ISBN 0-321-30454-3, Part 1.

Szor, The Art of Virus Research and Defense, Symantec Press (2005) ISBN 0-321-30454-3, Part 2.

Witten et al., Data Mining: Practical Machine Learning Tools and Techniques, Ian H. Witten & Eibe Frank, Elsevier (2005) ISBN 0-12-088407-0, Part 1.

Witten et al., Data Mining: Practical Machine Learning Tools and Techniques, Ian H. Witten & Eibe Frank, Elsevier (2005) ISBN 0-12-088407-0, Part 2.

Canadian Office Action, Application No. CA/2499073, dated Dec. 24, 2010.

Canadian Office Action, Application No. CA/2499073, dated Oct. 7, 2009.

Canadian Office Action, Application No. CA/2544063, dated Dec. 10, 2009.

European Office Action, Application No. EP/019067693, dated Aug. 12, 2009.

European Office Action, Application No. EP/019067693, dated Sep. 24, 2007.

Great Britain Office Action, Application No. GB/06116685, dated Nov. 14, 2006.

Indian Office Action, Application No. IN/1625/KOLNP/2006, dated May 10, 2010.

Indian Office Action, Application No. IN/656/CHENP/2005, dated Jun. 29, 2006.

International Search Report, PCT/US2001/002931, dated Jun. 3, 2002.

Israeli Office Action, Application No. IL/175036, dated Jul. 6, 2010.

PCT International Search Report and Written Opinion for International Application No. PCT/US07/81681, Mail Date Nov. 13, 2009, 8 pages.

Arneson, "Mass Storage Archiving in Network Environments" IEEE, 1998, pp. 45-50.

Rosenblum et al., "The Design and Implementation of a Log-Structure File System," Operating Systems Review SIGOPS, vol. 25, No. 5, New York, US, pp. 1-15 (May 1991).

International Search Report and International Preliminary Report on Patentability, PCT/US2003/029105, dated Apr. 12, 2005.

Written Opinion mailed Feb. 14, 2007, International Application No. PCT/US05/40606, 5 pages.

\* cited by examiner

COMBINED STREAM AUXILIARY COPY SYSTEM AND METHOD

This Application is a continuation of U.S. application Ser. No. 10/663,384, filed Sep. 16, 2003, which claims priority to provisional application No. 60/411,202 filed Sep. 16, 2002. The entirety of each of the foregoing applications is hereby incorporated by reference.

RELATED APPLICATIONS

This application is related to the following pending applications, each of which is hereby incorporated herein by reference in its entirety:

Application Ser. No. 09/610,738, titled MODULAR BACKUP AND RETRIEVAL SYSTEM USED IN CONJUNCTION WITH A STORAGE AREA NETWORK, filed Jul. 6, 2000, Application Ser. No. 09/609,977, titled MODULAR BACKUP AND RETRIEVAL SYSTEM WITH AN INTEGRATED STORAGE AREA FILING SYSTEM, filed Jul. 5, 2000, Application Ser. No. 09/354,058, titled HIERARCHICAL BACKUP AND RETRIEVAL SYSTEM, filed Jul. 15, 1999, Application Ser. No. 09/774,268 titled LOGICAL VIEW AND ACCESS TO PHYSICAL STORAGE IN MODULAR DATA AND STORAGE MANAGEMENT SYSTEM, filed, Jan. 30, 2001, Application Ser. No. 09/038,440, titled HIGH-SPEED DATA TRANSFER MECHANISM, filed Mar. 11, 1998, and Application Ser. No. 10/303,640 titled SELECTIVE DATA REPLICATION SYSTEM AND METHOD, filed Nov. 25, 2002.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

1. Field of the Invention

The invention relates to data storage in a computer network and, more particularly, to a system and method for optimizing storage operations.

2. Description of Related Art

The GALAXY data storage management system software manufactured by COMMVAULT SYSTEMS, INC. of Oceanport, N.J., uses storage policies to direct how data is to be stored. Referring to FIG. 1, there is shown a library storage system 100 in accordance with the prior art. Storage policies 20 in a management server 21 may be used to map copy data from a source 24, through a media agent 26 to a physical media location 28, 30, 32, 34, 36, 38 using e.g., tapes, drives, etc., where data is to be stored. Storage policies 20 are generally created at the time of installation of each media library, and/or stand alone drive. Numerous storage policies may be created and modified to meet storage management needs. A storage policy allows the user to define how, where, and the duration for which data should be stored without requiring intimate knowledge or understanding of the underlying storage architecture and technology. The management details of the storage operations are transparent to the user.

Storage policies 20 can be viewed as a logical concept that direct the creation of one or more copies of stored data with each copy being a self-contained unit of information. Each copy may contain data from multiple applications and from multiple clients or data sources. Within each copy are one or more archives, relating to a particular application. For example, one archive might contain log files related to a data store and another archive in the same copy might contain the data store itself.

Storage systems often have various levels of storage. A primary copy or data set, for example, indicates the default destination of storage operations for a particular set of data that the storage policy relates to and is tied to a particular set of drives. These drives are addressed independently of the library or media agent to which they are attached. In FIG. 1, the primary drives are media 28, 30, 32, 34, 36 and 38. Clearly other forms of storage media could be used such as tapes or optical media. The primary data set might, for example, contain data that is frequently accessed for a period of one to two weeks after it is stored. A storage administrator might find storing such data on a set of drives with fast access times preferable. On the other hand, such fast drives are expensive and once the data is no longer accessed as frequently, the storage administrator might find it desirable to move and copy this data to an auxiliary or secondary copy data set on a less expensive tape library or other device with slower access times. Once the data from the primary data set is moved to the auxiliary data set, the data can be pruned from the primary data set freeing up drive space for new data. It is thus often desirable to perform an auxiliary storage operation after a primary data set has been created. In FIG. 1, the auxiliary data set is copied to drives or tapes 40, 42 and 44.

Storage policies generally include a copy name, a data stream, and a media group. A primary copy name may be established by default whenever a storage policy for a particular client is created and contains the data directed to the storage policy. A data stream is a channel between the source of the data, such as data streams 50 and 52 in FIG. 1 and the storage media such as data streams 50 and 52 in FIG. 1. Such a data stream is discussed in HIGH-SPEED DATA TRANSFER MECHANISM, Ser. No. 09/038,440 referenced above. To increase the speed of a copy, data to be backed-up is frequently divided into a plurality of smaller pieces of data and these pieces are sent to a plurality of storage media using their own respective data streams. In FIG. 1, data from source 24 is broken into two portions and sent using streams 50, 52 to media 28, 36.

A client's data is thereby broken down into a plurality of sub-clients. In FIG. 1, media 28, 30, 32 and 34 may comprise a single media group and media 36 and 38 a second media group. A media group generally refers to a collection of one or more physical pieces of storage media. Only a single piece of media within the group is typically active at one time and data streams are sent to that media until it achieves full capacity. For example, data stream 50 will feed source data to medium 28 until it is full and then feed data to media 30. Multiple copies may be performed using multiple streams each directed to a respective media group using multiple storage policies.

Auxiliary copying, discussed in more detail in commonly owned application Ser. No. 10/303,640, denotes the creation of secondary copies, such as medium 40 or medium 42, of the primary copy. Since auxiliary copying involves multiple storage policies and data streams which each point to a particular media group, data is likely scattered over several pieces of media. Even data related to single stream copy operations might also be scattered over several media. Auxiliary copying is generally performed on a stream-by-stream basis and one stream at a time, in an attempt to minimize the number of times the primary media are mounted/unmounted. For example, for a copy of 10 pieces of primary media where four streams are used, auxiliary copying first entails copying all archive files of the first stream to a first set of auxiliary media, then the second stream to a second set of auxiliary media, etc. In FIG. 1, an auxiliary copy of stream 50 is made using auxiliary stream 50a to medium 40 and, if needed, medium 42. Thereafter, an auxiliary copy of stream 52 is made using auxiliary stream 52a to medium 44.

An archive file, at least with respect to auxiliary copying, is generally copied from a first chunk of data to a last chunk. When an auxiliary copy operation is cancelled or suspended before all chunks of an archive file are successfully copied to the destination copy, the chunks successfully copied are generally discarded or overwritten later when the archive file is again copied to the same copy or medium. This is undesirable because it wastes time and resources to copy the same chunks repeatedly; it wastes media because useless data occupies the media until the media is reusable; and if the network is not stable, a large archive file may never be successfully copied.

Although the GALAXY data storage management system software provides numerous advantages over other data storage management systems, the process for restoring copied data may require access to several media, which involves multiple mounting/unmounting of media, thereby increasing the time necessary for a restoration. Additionally, although an effort is made to minimize the number of times media are mounted and unmounted, the stream-by-stream basis used in auxiliary copying does not minimize the number of mount/unmount times necessary for the auxiliary copy and does not minimize tape usage. For example, in FIG. 1, media 40 and 44 may both be less then half full but both are needed to copy data through streams 50a, 52a using conventional techniques and both must be remounted for a restore. Performing auxiliary copying on a stream-by-stream basis is also generally a lengthy process. Finally, restarting a copy of an archive file that has been cancelled or suspended by always copying the first to the last chunk is inefficient with respect to media usage and the time necessary to complete a copy.

There is therefore a need in the art for a system and method for increasing the efficiency of storage management systems.

SUMMARY OF THE INVENTION

A system and method for transferring data in a library storage system. The library storage system comprises a media server including a storage policy. A media agent is connected to the media server. A plurality of storage media and a data source are connected to the media agent. The media agent divides the data source into at least a first and a second portion of data. The portions of data are transferred from the data source to a first and second primary storage medium using a first and a second data stream respectively. The media agent then causes the first and second portion of data to be transferred from the first and second storage medium to a third auxiliary storage medium using a third combined data stream. Auxiliary copying is performed in chunks and multiple streams are copied in parallel.

One aspect of the invention is a method for transferring data in a library storage system. The library storage system comprises a management server. A media agent is connected to the management server. A plurality of storage media are connected to the media agent and a data source is connected to the media agent. The method comprises dividing the data source into at least a first and a second portion of data. The method further comprises transferring the first and second portion of data from the data source to a first and second storage medium using a first and a second data stream respectively. The method still further comprises transferring the first and second portion of data from the first and second storage medium to a third storage medium using a third combined data stream.

Another aspect of the invention is a system for transferring data. The system comprises a data source, a media agent connected to the data source and a management server connected to the media agent. The system further comprises at least a first, second, and third storage medium connected to the media agent. The data source is divided into at least a first and a second portion of data. The media agent transfers the first and the second portion of data from the data source to the first and second storage medium using a first and second data stream respectively. The media agent transfers the first and second portion of data from the first and second storage medium to the third medium using a third combined data stream.

Still another aspect of the invention is a recording medium in a storage system with data stored thereon. The storage system comprises a management server, a media agent connected to the management server, a plurality of storage media connected to the media agent, and a data source connected to the media agent. The data is produced by splitting data source into at least a first and a second portion; transferring the first portion to a first storage medium using a first stream; transferring the second portion to a second storage medium using a second stream; and transferring the first and second portion of data from the first and second storage medium to a third storage medium using a third data stream.

Yet still another aspect of the invention is a method for transferring data in a storage system. The storage system comprises a management server, a media agent connected to the management server, a plurality of storage media connected to the media agent, and a data source connected to the media agent. The method comprises dividing the data source into at least a first and a second portion of data. The method further comprises transferring the first and second portion of data from the data source to a first number of pieces of storage media. The method further comprises transferring the first and second portion of data from the first number of pieces of storage media to a second number of pieces of storage media, the second number being less than the first number.

DETAILED DESCRIPTION OF THE INVENTION

The efficiency of data storage management systems is increased in the invention by providing a system and method that combines data streams of one or more storage policies during an auxiliary copying operation. Combining data streams generally denotes copying or backing-up archive files associated with different streams, onto a single or a fewer number of streams, thereby minimizing the number of media required for an auxiliary copy operation and consequently reducing the number of mount/unmount times necessary.

Figure 1:
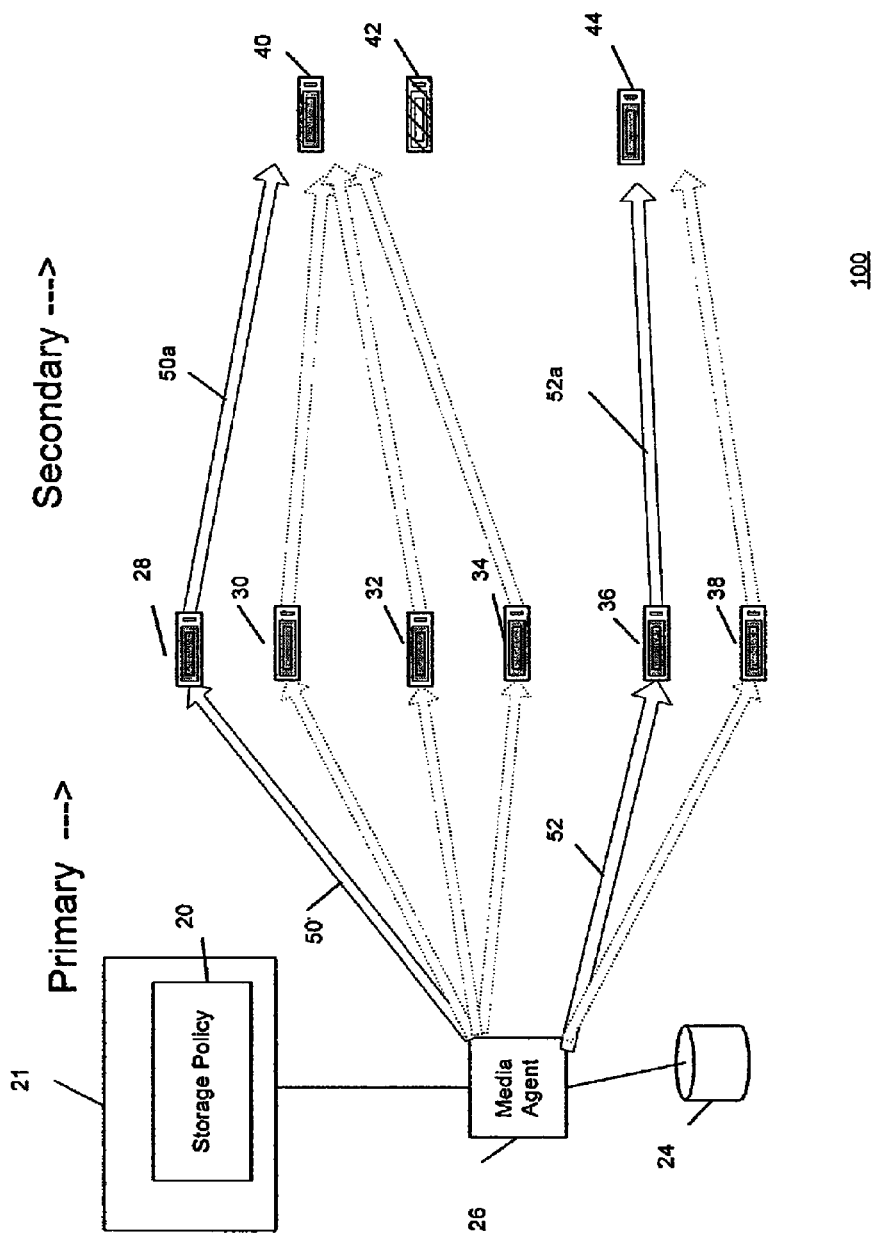
FIG. 1 is a block diagram showing the operation of a library storage system in accordance with the prior art.
Figure 2:
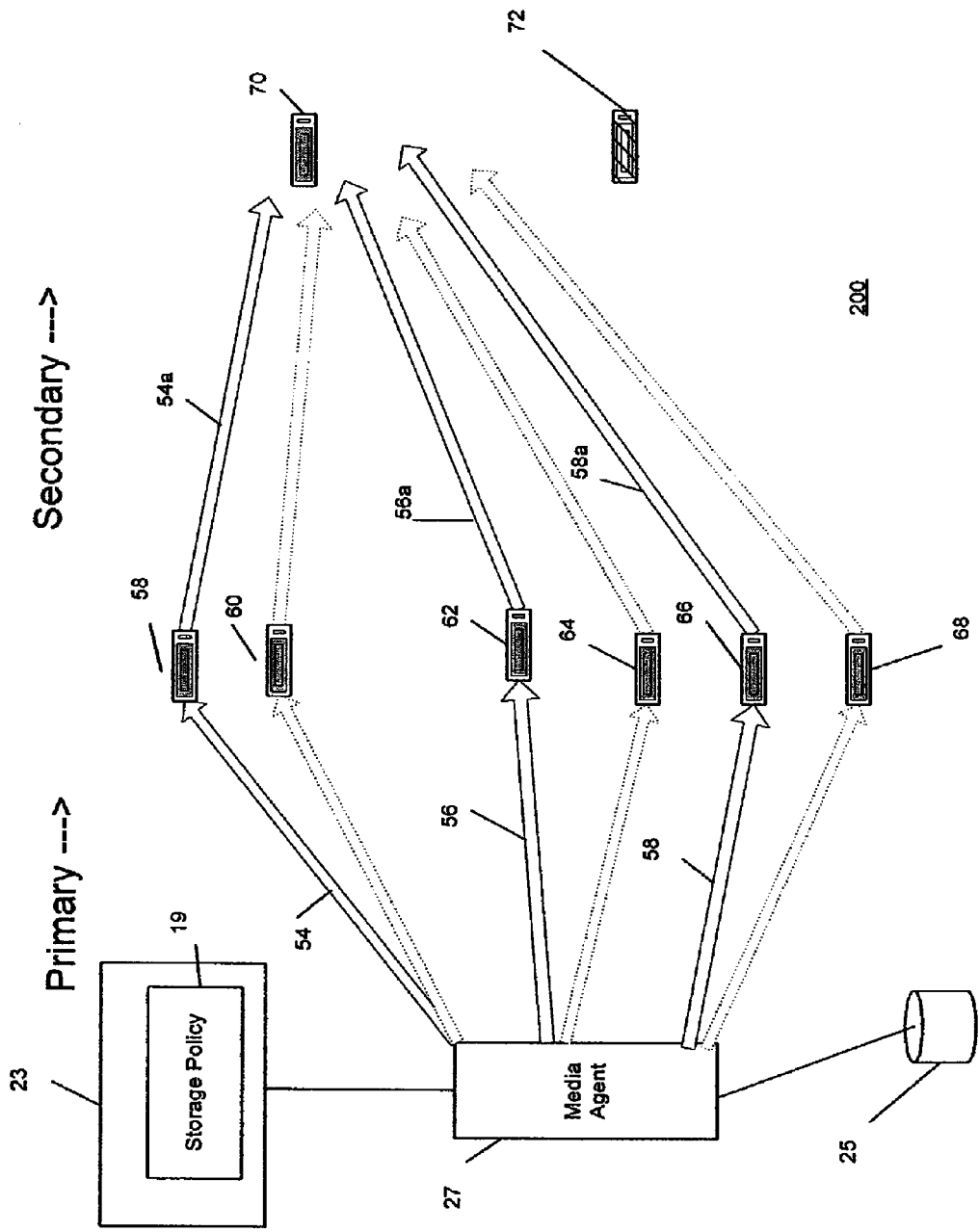
FIG. 2 is a block diagram showing the operation oaf library storage system in accordance with the invention.

Combining streams may be enabled by allowing a plurality of applications in a source to be copied to point to a single storage policy. Referring to FIG. 2, there is shown a library storage system 200 in accordance with the invention. Data from a plurality of applications (e.g. EXCHANGE, WORD, EXCEL, etc.) from a source 25 is controlled via media agent 27 according to storage characteristics specified by a storage policy 19 in a management server 23. The data are each copied to a respective medium, such as a hard drive, tape, etc. through streams 54, 56, 58. For example, for a primary copy or storage of three applications, the data from each of the applications will be saved to tapes 58, 60, 62, 64, 66 and 68, respectively, through streams 54,56, and 58 respectively, thereby requiring at least three tapes for the copy operation, i.e., tapes 58, 62, and 66. During the auxiliary copy operation which combines streams, the data on tapes 58, 62 and 66 are combined into fewer media—i.e., tape 70 and, only if needed, tape 72. This may be accomplished, for example, by a storage policy pointing to either the same or another media library for storing the auxiliary copies. Thus, the primary copy operation requires three tapes, but the auxiliary copy is reduced to one tape, assuming the capacity of one tape is sufficient to hold the data from the three applications.

The archive files may be given an application identification, e.g., appId (sub-client), and the files are copied by default in ascending order according to the appId in order to minimize the impact on restore speeds. Alternately, combining streams can be done stream-by-stream for the fastest copying times as discussed below.

In addition to combining data streams, data is copied to the auxiliary media 70, 72 in a logical order, such as in the order of the primary copy according to the date the primary archive files were create. In this way, the archive files of a copy may be copied together in a single medium, allowing users to more easily determine which medium contains a particular copy.

Combining streams helps in media recycling. For instance, assume that there are several primary copies on four media that correspond to four streams and archive pruning has pruned all but one copy. The remaining copy may still hold up the four media. If the primary copy is copied, job-by-job, into one stream to an auxiliary copy, the primary copy will be copied onto one medium and the other three primary media are then recyclable.

The option of combining data streams may be selected or specified as an optional copy method at the time a particular storage policy is created or defined. The combined data stream copy method may be applied to either synchronous data replication or selective data replication. Primary copies requiring multiple streams will generally not be copied to a medium with copies using combined streams. A copy made pursuant to a storage policy that combines streams generally cannot be changed into a copy that doesn't combine streams and vice versa.

A storage policy that combines streams includes a property, which may be selected or defined, that may be used for specifying the order for which data will be copied to media, e.g., a copy order. By default the copy order is in the order of application and job (explained below). This enhances efficiency with respect to restoring data from the copy. Alternately, the user may specify that the data be copied in the order of the stream number which is more efficient but yields a high penalty for restores.

The "order of application and job" technique works as follows. All copy jobs within a given instance/copySet are copied together, e.g., all jobs selected for each client, app-Type, and instance/copySet. The jobs, e.g., the archive files, are then copied in the ascending order of their archive file Identification ("Ids"). Once a job copy is started, all the job's archive files are copied together, even if those numbers are higher than other archive file Ids.

For example, if a copy set has two sub-clients with following archive files: (1) Sub-client 1: Job 1, archive file 1 ("AF1") created 2:00 pm, (2) Sub-client 2: Job 2, archive file 2 ("AF2") created 3:00 pm, (3) Sub-client 1: Job 1, archive file 3 ("AF3") created 4:00 pm (resumed and finished or a multi-archive file job like exchange database), and (4) Sub-client 1: Job 3, archive file 4 ("AF4") created 5:00 pm. The copy order is AF1, AF3 (to finish Archive files of the job being copied), AF2, and AF4.

When a property or feature of the primary copy is changed or modified, the copy order of each auxiliary copy that combines streams may also be changed. For example, if the primary copy was copied on a non-magnetic medium and now will be copied on a magnetic medium, the copy order will automatically be set to in order of application and job for all secondary copies. Otherwise, there will be generally no change in the copy order for the secondary copies. After the primary copy has been changed, the former primary copy by default will not combine data streams.

During the creation of a storage policy for a nonmagnetic media group or drive, the graphic user interface ("GUI") includes a form element, e.g., check box, that allows the user to select the combine data stream option. The option is preferably checked OFF by default. Users can select the option by selecting or turning the feature ON in the Copy Policy interface screen in order to enable the combine data stream option.

If the combine data stream option is selected, the copy order property will be enabled which allows the user to select from one of two choices: in order of stream number and in order of application and job. For a storage policy or policies for auxiliary copies whose primary copy is saved or to be saved on magnetic media or drives, where the combine data stream option is selected, the copy order is preferably in order of application and job by default. Otherwise, the default copy order is in order of application and job. The copy order can be changed from one to the other at any time.

The GUI may display a message, such as a popup message, in the following situations:

Where the primary copy is stored or to be stored on non-magnetic media or drives, if the user selects the combine data stream option or changes the copy order, the GUI warns the user about a higher amount of mount/unmount and tape seek activity during restores that will occur if the combine stream option is in order of stream number or during auxiliary copies if the option is in order of application and job.

If the user tries to point a SQL or DB2 sub-client to a storage policy that has a copy with the combine data stream option selected, the GUI warns the user that the multi-stream SQL or DB2 copies will not be copied using combined streams.

If a storage policy is pointed to by a SQL or DB2 sub-client and the user tries to create a new copy with the combine data stream option selected or tries to select the combine data stream option for an existing copy, the GUI warns the user that the multi-stream SQL or DB2 copies will not be copied to an existing copy using combined streams.

An archive manager is a computer program or instruction that manages archive operations, such as creating and updating a storage policy, and retrieving data related to a storage policy. The archive manager may be implemented as an application or module and resides on a reference storage manager or media agent. An archive manager is preferably embodied in an ArchiveManagerCS class that is implemented as an Application Program Interface (API). The class further interfaces with at least one database or table which preferably includes the details of storage policies, such as the copy name, data stream, media group, combine data stream properties, etc. The database or table includes values such as streamNum and flags, which indicate the selection of the combine data stream option. Additionally, the database or table may be accessed by other object classes, which may use the relevant data contained therein.

The stream number of an archive file copy is passed to a createCopy( ) method included in CV Archive. Additionally, an AuxCopyMgr process sends the stream number of an archive file copy to a remote auxCopy process in a CVA_COPYAFILE_REQ message.

All copies associated with a storage policy have the same number of streams, e.g., the maximum number of streams, of the storage policy. This does not mean that a library for each copy has to have the same number of drives. A primary copy needs enough drives to support multi-stream copy. An auxiliary copy that combines data streams actually needs only one drive for auxiliary copying and for data restoration. Consequently, the associated library can be a stand-alone drive. In order to take advantage of stream consolidation, users that select the combine stream option are allowed to create a storage policy pointing to a storage library with fewer auxiliary drives than copies.

Backup and synthetic full backups are allowed, which include a backup process writing the streamNum related to a storage policy into the archFileCopy table rather than archFile table when each archive file is created. The archive manager preferably handles this process.

A file system-like restore (involving indexing) includes one or more sub-clients. The sub-client restorations, may be performed serially, one at a time, in an arbitrary order or based on archive file location. For example, for each sub-client restore, archive files may be restored chronologically, such as in the order that the files were created. Alternatively or in addition, files may be restored, according to their offsets, such as restoring in order of offsets ascending within each archive file. Offset refers to the distance from a starting point, e.g., the start of a file. Movement within an archive file typically corresponds with higher physical offsets from the beginning of the archive file.

The archive files in a secondary or auxiliary copy that are created by combining data streams are by default ordered as required for restoration. Restore efficiency could therefore be better with the auxiliary copy than with the primary copy. With respect to combining data stream-by-stream, the order of the archive files on media holding an auxiliary copy, may not agree with the order the primary copies were created, which may require backwards tape movement during the restore. Backwards tape movement, the need to rewind, may be correctly handled by programming, such as by DATAMOVER software by GALAXY, during data restoration. Backward movement, however, has a negative impact on performance. A multi-stream ORACLE or INFORMIX copy can be restored from a single stream. However, backwards tape movement during the restore may occur.

It is preferred that a copy involving multiple streams will not be copied to a copy medium that combines streams. Single stream copies may be copied to a copy medium that combines streams.

Figure 3:
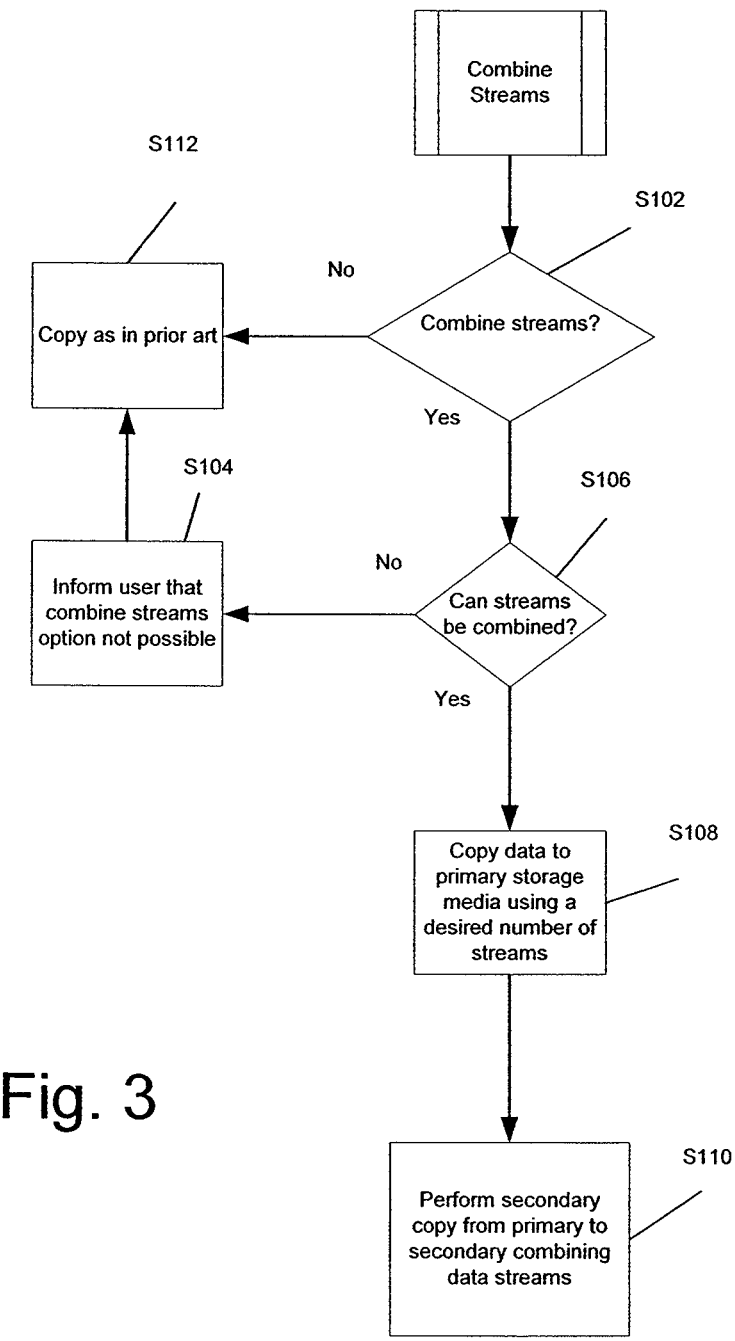
FIG. 3 is a flow chart detailing some of the operations of an embodiment of the invention.

Referring to FIG. 3, there is shown a summary of the operations of the invention with respect to combining streams. At step S102, the storage policy is queried or the user is asked whether the combine streams option should be enabled in his copy. If the user answers no or the storage policy indicates no, control branches to step S112 and copying is performed as in the prior art. Otherwise, control branches to step S106, and the system determines whether the streams can be combined. For example, auxiliary copy of SQL data should be the same number of streams as the primary copy. If the streams cannot be combined, control branches to step S104, the user is informed that the streams cannot be combined, and copying is performed as in the prior art in step S112.

If the streams can be combined, control branches to step S108 and the data is backed up to the primary storage media using a desired number of streams. Thereafter, control branches to step S110 where the auxiliary copy is performed combining data streams.

Copy Restartable at Chunk

As stated above, in prior art auxiliary copying systems, auxiliary file copying restarts from a first chunk if the auxiliary copying was interrupted. This means if the copying operation is stopped in the middle, all copied chunks need to be copied again.

In the invention, auxiliary copying is performed such that data chunks of an archive file that have been successfully copied to a copy medium are not discarded and the copy operation resumes copying where the previous copying left off; auxiliary copy operations are restartable by a chunk, as opposed to restartable at archive file. Copying that is restartable at a chunk may be achieved with an API which calls a class that includes methods that do not delete the copied chunks. For example, the createArchFileCopy( ) method in the ArchiveManagerCS class may include an instruction so that the successfully copied chunks are not deleted. A method may further be included to retrieve the last chunk copied for each archive file to be copied, such as a getToBeCopiedAfilesByCopy( ) method in the ArchiveManagerCS class. Additionally, new fields may be added into the CVA_COPYAFILE_REQ, such as messagearchFileSeqNum, startChunkNum, startLogicalOffset and startPhysicalOffset fields.

The process for restarting a copy at chunks includes the AuxCopyMgr process checking if the archive file to be copied has chunks that were successfully copied to the copy media. If chunks have been copied successfully, the AuxCopyMgr process retrieves variables archFileSeqNum, startChunkNum, startLogicalOffset and startPhysicalOffset for the archive file and sends them to the AuxCopyprocess in the CVA_COPYAFILE_REQ message. For each stream of the destination copy, the AuxCopyMgr process starts copying from the archive file that has chunks that were successfully copied. The AuxCopy process calls CV Archive::createCopy( ) using the parameters archFileSeqNum, startChunkNum, startLogicalOffset and startPhysicalOffset. This allows AuxCopy to start writing or copying from the correct chunk and offset. The AuxCopy process may also call DataMover::Seek( ) with startPhysicalOffset as one of the input parameters to find the starting chunk and offset before the first DataMover::Read( ) call.

Additionally, the CV Archive::createCopy( ) API, which is used by AuxCopy, includes input parameters archFileSeqNum, startChunkNum, startLogicalOffset and startPhysicalOffset. When startChunkNum>1, the API does not send a CVA_CREATEAFILECOPY_REQ message to commServer for creating an archFilecopy entry since there is one already. The API also uses the parameters passed in to it to call Pipelayer::create( ).

Multi-Stream Auxiliary Copy

In another aspect of the invention, methods and systems are provided which allow multi-stream auxiliary copying. In the prior art, auxiliary copying is performed one stream at a time no matter how many streams are used during a copy. The amount of time for copying a copy job is therefore proportional to the number of streams used during a copy. This is referred to as single-stream Auxiliary Copying.

In the invention, multi-stream Auxiliary Copying refers to performing auxiliary copies for a plurality of streams in parallel. This may be accomplished by providing a sufficient number of drives so that each stream may copy to at least one drive, thereby reducing the time necessary for auxiliary copies involving multiple streams. For example, in an instance where two drives are required for each stream (e.g., one source and one destination), the number of streams that can be copied at the same time is half of the number of available drives. If six streams were used for copy jobs, an auxiliary copy job can copy archive files for three streams at a time if there are six drives available, and can copy archive files for six streams at a time if there are twelve drives available, etc.

The process for multi-stream auxiliary copying includes the AuxCopyMgr process reserving more than one stream for the same destination copy or for multiple destination copies at same time. One stream is assigned to one destination copy at a time. If the AuxCopyMgr process has not reserved enough streams, the process will keep trying if some streams are temporarily not available. When a copy is done with a stream for a destination copy, the AuxCopyMgr first releases the stream then tries to reserve the next stream (the copy can be different). The AuxCopy process is able to run more than one worker thread that copies an archive file for a stream and each thread uses its own pipeline. When an Auxiliary Copy job is interrupted, stopped, or cancelled, the AuxCopy process stops all the worker threads and exits, and the AuxCopyMgr process releases all the streams and exits. If an AuxCopy process fails to copy for one stream, the worker thread reports the failure to AuxCopyMgr process and exits. The AuxCopy process continues to run until no work thread is running or is stopped by AuxCopyMgr. Depending on the nature of the failure, the AuxCopyMgr process decides whether it is necessary to stop copying archive files for all streams of a copy or stop copying archive files for all copies.

Thus, by combining streams in auxiliary copying, auxiliary copy operations are optimized. By allowing auxiliary copies to be performed by chunk, auxiliary copying may be performed more efficiently even if the copying is interrupted. By allowing for multiple stream auxiliary copies, auxiliary copying may be performed even more quickly than that available in the prior art.

Although the invention has been described in connection with the GALAXY data management system by way of example, it is understood that the disclosure may be applied to other data management systems, and references to the GALAXY system should therefore not be viewed as limitations.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for transferring data in a multi-tiered storage system, the system comprising:
    a data source comprising primary data stored in at least a first storage device, wherein the primary data in the first storage device is divided into at least a first portion of data associated with a first application having a first file type, and at least a second portion associated with a second application having a second file type;
    a media agent comprising computer hardware, the media agent configured to communicate with the data source; the media agent is further configured to:
        transfer the first portion of data in the first storage device to a second storage device with a first data stream and transfer the second portion of data in the first storage device to a third storage device with a second data stream respectively to create a first backup copy of the primary data stored in the first storage device;
        identify the first and second file types associated with the first and second portions of data in the first backup copy;
        determine based at least upon the first and second file types if the first portion of data and the second portion of data in the first backup copy can be combined;
        if the first portion of data and the second portion of data can be combined, the media agent is configured to create a second backup copy of the first and second portions of data that is ordered for subsequent restoration wherein the media agent performs the second backup copy at least in part by being configured to:
            order the first and second portions of data existing in the first backup copy based at least in part on the order of the first and second applications, and
            create the second backup copy by storing the ordered first and second portions of data on a fourth storage device in the combined format,
    wherein the first portion of data is restored to the data source by retrieving the first portion of data from the combined format of the second backup copy.

2. The system as recited in claim 1, wherein the order the first and second portions of data in the second backup copy is further based on job order.

3. The system as recited in claim 1, wherein the order the first and second portions of data in the second backup copy is further based on an archive order.

4. The system as recited in claim 1, wherein the order of the first and second portions of data in the second backup copy is further based on respective stream numbers of the first and second streams.

5. A computer-implemented method for transferring data in a storage system, the method comprising:
    as implemented by one or more hardware processors,
    dividing with a media agent comprising computer hardware a data source comprising primary data stored in at least a first storage device, into at least a first portion of data associated with a first application having a first file type, and at least a second portion associated with a second application having a second file type;
    creating a first backup copy of the primary data by transferring with the media agent the first portion of data to a second storage device, and by transferring the second portion of data to a third storage device;
    identify the first and second file types associated with the first and second portions of data in the first backup copy;
    determining if the first portion of data and the second portion of data are combinable based upon the first and second files types contained in the first and second portions of data; and
    creating with the media agent, a second backup copy of the first and second portions of data that is ordered for subsequent restoration wherein creating the second backup copy comprises:

ordering the first and second portions of data existing in the first backup copy based at least in part on the order of the first and second applications, and creating the second backup copy by storing the ordered first and second portions of data on a third storage device in the combined format, restoring the first portion of data by causing retrieval of the first portion of data from the combined format of the second backup copy.

6. The computer-implemented method of claim 5, additionally comprising providing a user notification if the first portion of data and the second portion of data cannot be combined.

7. The computer-implemented method of claim 5, wherein the order the first and second portions of data in the second backup copy is further based on job order.

8. The computer-implemented method of claim 5, further comprising accessing a storage policy to determine if the first portion of data and the second portion of data are combinable.

9. The computer-implemented method of claim 5, wherein the second and third storage devices have a faster access time than the fourth storage device.

10. The computer-implemented method of claim 5, wherein the order the first and second portions of data in the second backup copy is further based on an archive order.

11. The computer-implemented method of claim 5, wherein said determining comprises determining that the first portion of data and the second portion of data are not combinable if one or more of the first portion of data and the second portion of data include SQL data or DB2 data.

12. The system of claim 1, wherein a user is provided notification if the first portion of data and the second portion of data cannot be combined.

13. The system of claim 1, further comprising a management server which is in communication with the media agent and stores a storage policy, wherein the media agent is further configured to access the storage policy to determine if the first portion of data and the second portion of data are combinable.

14. The system of claim 1, wherein the second and third storage devices have faster access times than the fourth storage device.

15. The system of claim 1, further comprising an archive module configured to store at least one storage policy, wherein the media agent is further configured to access the storage policy to determine if the first portion of data and the second portion of data are combinable, wherein the additional copies comprise one or more archive files.

16. The system of claim 1, wherein the media agent is configured to determine that the first portion of data and the second portion of data are not combinable if one or more of the first portion of data and the second portion of data include SQL data or DB2 data.

* * * * *

UNITED STATES PATENT AND TRADEMARK OFFICE
CERTIFICATE OF CORRECTION

| | | |
|---|---|---|
| PATENT NO. | : 8,667,189 B2 | Page 1 of 1 |
| APPLICATION NO. | : 13/745207 | |
| DATED | : March 4, 2014 | |
| INVENTOR(S) | : Jun Lu | |

It is certified that error appears in the above-identified patent and that said Letters Patent is hereby corrected as shown below:

In the Specification

In column 3, line 37, change "then" to -- than --.

In column 4, line 54, change "oaf" to -- of a --.

In column 5, line 35, change "create" to -- created --.

In column 6, line 7, change "("AFI")" to -- ("AF1") --.

In the Claims

In column 10, line 35, in Claim 2, after "order", insert -- of --.

In column 10, line 38, in Claim 3, after "order", insert -- of --.

In column 10, line 53, in Claim 5, change "haying" to -- having --.

In column 11, line 15, in Claim 7, after "order", insert -- of --.

In column 11, line 24, in Claim 10, after "order", insert -- of --.

Signed and Sealed this
Thirty-first Day of March, 2015

Michelle K. Lee
*Director of the United States Patent and Trademark Office*